US005101094A

United States Patent [19]

Keller et al.

[11] Patent Number: 5,101,094

[45] Date of Patent: Mar. 31, 1992

[54] DEVICE FOR THERMICALLY CUTTING OF TEXTILE MATERIAL

[75] Inventors: Walter Keller, Wetzikon; Hansruedi Stutz, Dietlikon, both of Switzerland

[73] Assignee: Gebruder Loepf AG, Kempton, Switzerland

[21] Appl. No.: 507,607

[22] Filed: Apr. 10, 1990

[30] Foreign Application Priority Data

Apr. 12, 1989 [CH] Switzerland ........................ 1405/89
Oct. 30, 1989 [CH] Switzerland ........................ 3913/89

[51] Int. Cl.[5] ........................ H05B 1/00; D03D 49/70; B65B 51/00; B29C 27/00

[52] U.S. Cl. ........................ 219/221; 30/140; 83/15; 83/171; 139/291 C; 139/302; 156/515; 219/233; 219/235; 219/243

[58] Field of Search ........................ 219/221, 227-230, 219/233-235, 243; 30/140; 83/15, 16, 171; 139/291 C, 302; 156/515

[56] References Cited

U.S. PATENT DOCUMENTS

| | | | |
|---|---|---|---|
| 1,834,555 | 12/1931 | Tittle | 219/233 X |
| 2,526,750 | 1/1950 | Siegel | 30/140 |
| 2,701,835 | 2/1955 | Anton | 30/140 |
| 2,711,779 | 6/1955 | Carland | 156/515 X |
| 2,711,780 | 6/1955 | Hakomaki | 156/515 X |
| 2,997,098 | 8/1961 | Riese et al. | 156/515 X |
| 3,320,111 | 5/1967 | Lucia et al. | 156/515 |
| 3,368,930 | 2/1968 | Beason | 156/515 X |
| 3,961,650 | 6/1976 | Marowsky | 139/291 C |
| 4,259,134 | 3/1981 | Joice | 156/515 X |
| 4,572,245 | 2/1986 | Gachsay | 139/302 X |
| 4,798,934 | 1/1989 | Boyer | 30/140 X |

FOREIGN PATENT DOCUMENTS

| | | | |
|---|---|---|---|
| 540169 | 4/1957 | Canada | 156/515 |
| 2142855 | 2/1973 | France | 219/233 |
| 47-12231 | 4/1972 | Japan | 139/302 |
| 50-27101 | 9/1975 | Japan | 139/291 C |
| 465342 | 10/1975 | U.S.S.R. | 156/515 |

*Primary Examiner*—Anthony Bartis
*Attorney, Agent, or Firm*—Harness, Dickey & Pierce

[57] ABSTRACT

The device for cutting textile material and sealing the edges of the cut material comprises a heated resistance wire of round cross section supported in a supporting means. The wire forms a flattened central portion shaped to form a semi-circular bow having a symmetrical shape with a curved outer edge ground to a feather cutting edge, an inner edge and two lateral flat faces parallel to each other along which the edges of the textile material are moved after being cut by combined mechanical and thermal action of the wire. The edges of the textile material are sealed thereby. Since the temperature of the wire can be kept relatively low, no ridges of melted material are formed along the edges of the textile material.

10 Claims, 2 Drawing Sheets

DEVICE FOR THERMICALLY CUTTING OF TEXTILE MATERIAL

BACKGROUND OF THE INVENTION

1. Field of the Invention

The invention refers to a device for thermically cutting of textile material by means of a heated cutting wire relative to which said textile material is moved. Devices of this type are especially used to cut away the selvedge of a cloth or fabric in weaving looms. Simultaneously, the newly generated edge of the fabric is heat sealed by these devices.

2. Description of the Prior Art

Known cutting devices of this type, as e.g. applicant's own Thermocut TC-1 S device, comprise a free cutting wire extending through the plane of the cloth and being heated substantially above the melting temperature of the cloth so that the textile material is melted already before contacting the wire. The disadvantage of these known cutting wires is their high temperature which causes the cloth material to melt and to form a ridge along the edge of the fabric. Droplets or particles of melted material may also be produced. Such thickened edges of cloth are disturbing for subsequent processes, as e.g. calendering, since the calender rolls may be damaged by said particles of melted cloth material. When the cloth is rolled up by a cloth winding device the thickened edges lead to unequal radii of the rolls between their edges and their center which may result in lateral displacement of the layers of the roll. Furthermore, the coating of driver rolls of a cloth winding device undergoes substantially increased wear in the zone of the thickened edge of the cloth. Finally, the high temperature necessary in conventional cutting wires results in a high energy consumption, in the production of smoke and gases and in a certain danger of fire.

SUMMARY OF THE INVENTION

Hence, it is a general object of the present invention to provide for a device for thermically cutting textile material, which does not result in thickened cutting edges.

A further object of the invention is to provide for a thermo-cutting device, which safely cuts textile material at relatively low temperature.

It is still a further object of the invention to provide for a cutting device of the above kind, by which a good seal of the cutting edges of the textile material is achieved.

Finally, it is another object of the invention to provide for a cutting device allowing to easily control the degree of sealing of the cutting edges.

Now, in order to implement these and still further objects of the invention, which will become more readily apparent as the description proceeds, the cutting device is manifested by the feature of having a heated cutting member for textile material, said cutting member comprising a resistance wire with two ends mounted to a supporting means and connected to a voltage source, said wire forming a loop having at least one arched or straight cutting section in its apex, in which said wire is flattened to provide at least one substantially flat face and said supporting means being adjustable relative to said textile material so that said wire loop contact said textile material along said flattened cutting section.

The heated wire thereby enters with its flattened cutting section the textile material in the apex of the loop and cuts the same by combined mechanical a thermal action. The textile material then is guided tangentially along said flat face of the flattened cutting section, whereby a sufficient thermal contact occurs to seal the cut edge even at relatively low temperature of the wire. Preferably, the wire may by sharpened at its outer edge in said flattened cutting section which even increases the mechanical cutting action, especially when the cloth to be cut is tensioned. The thermal cutting effect thereby can substantially be supported by mechanical action, which again allows to further reduce the wire temperature.

By means of said flattened cutting section in the apex of the heated wire, the textile material after being plasticized by the heat of the wire is cut by mechanical action, where after the edges are sealed by moving the material along said flat face at the flattened cutting zone of the moderately heated wire, whereby any forming of ridges is avoided.

BRIEF DESCRIPTION OF THE DRAWINGS

The invention will be better understood and objects other than those set forth above will become apparent when consideration is given to the following detailed description thereof. Such description makes reference to the annexed drawings, wherein:

Turning to FIG. 1, a first embodiment of the cutting device is shown in slightly enlarged side view together with a textile cloth 1 to be cut. The cloth is driven to pass under the cutting device into the direction indicated by an arrow, by known transporting means (not shown). The transporting means may be formed by the take up roller of a weaving loom provided with cutting devices of the invention. The cutting device itself comprises a supporting body 2 arranged above the plane of the cloth, wherein a loop of a resistance wire is mounted. The resistance wire is soldered to connection pins 4 at soldering points 8. To the connection pins 4 electric supply cables can be connected (not shown). The supply circuit including a respective control circuit for the heating current is disclosed in the prior published European patent application No. 0 134 190 by the applicant and is incorporated by reference into this specification.

Figure 4:
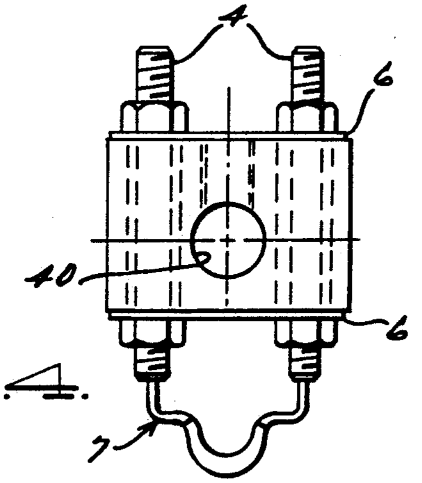
FIG. 4 shows the cutting device together with a supporting body.

The connection pins 4 are fixed within the supporting body 2, but are electrically isolated from the same by means of isolating layers 6, as especially can be seen from FIG. 4.

The resistance wire preferably is made of a corrosion-resistant alloy named Nikrothal, and has a diameter D in the range between 0.5 and 1 mm, depending of the respective application. It is shaped to form a loop 7 having a curved section 10 at its lowest point. Furthermore, the loop preferably is shaped to avoid mechanical load on the soldering points 8. For this purpose two additional bends 11 are provided in the loop which take up the expansion of the wire when heated.

Figure 1:
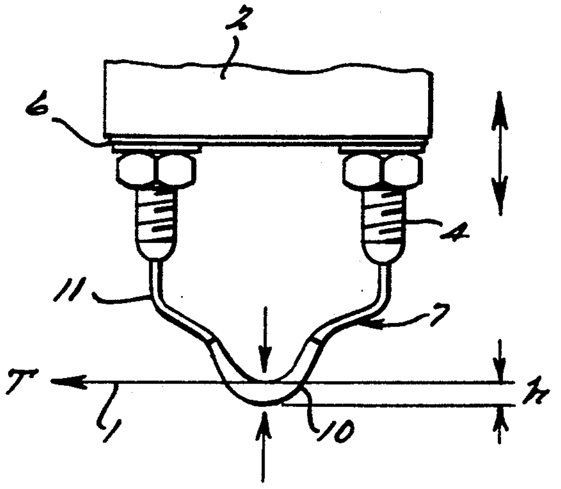
FIG. 1 is a side view of the lower part of the cutting device in operation position relative to a textile material.

The wire loop 7 preferably is shaped symmetrically as can be seen from FIG. 1 which prevents any wrong mounting. If the power supply fails and the wire no longer is heated, the cloth is passed below the loop 7 without being cut. However, due to the shape of the wire loop neither the cutting device nor the cloth is damaged thereby since the loop 7 with its apex simply will glide on the cloth. This is a big advantage compared with the prior art devices.

Figure 2:
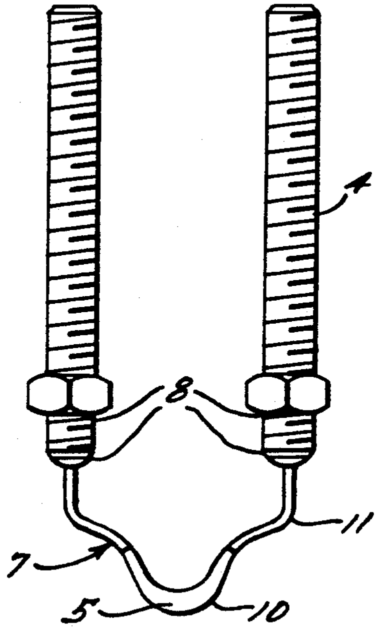
FIG. 2 exhibits the wire of said cutting device together with its contact pins.
Figure 3:
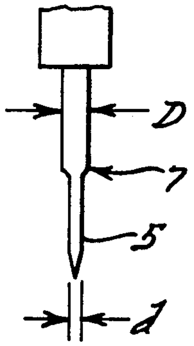
FIG. 3 is a front view of the wire.
Figure 5:
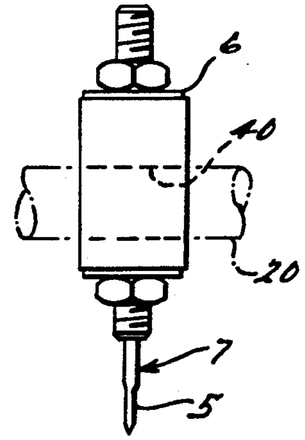
FIG. 5 is a front view of the cutting device of FIG. 4 mounted in a supporting rod.

In a first embodiment the apex 10 of the wire has a curved shape (FIG. 2). In the curved section 10 or apex of the wire, it is flattened, as can be seen from FIGS. 3 and 5. The originally circular cross section of the wire with a diameter of 1 mm is flattened by compression to a thickness of about 0.5 mm. The extension of the wire in a direction transverse to its reduced diameter is increased accordingly. Thereby, lateral flat faces 5 with a height of about h=1.5 mm are formed in the curved section 10 of the wire. At the outer edge of this section the wire preferably is ground, so that a sharp knife-like edge is formed acting on the cloth, passed under the cutting device under a certain tension. By this mechanical action in combination with the heat of the wire the plasticized cloth is cut when it moves against the forward edge of the curved section of the wire.

In the zones beside the curved section 10, the wire preferably has a circular cross section for reducing the heat loss by radiation in these zones and to concentrate the heat flow to the faces 5 of the cutting section 10.

In operation the wire is heated to a temperature, which is not substantially higher than the melting temperature of the textile material to be cut. A heat flow and temperature for heating the textile material to a thermoplastic state is sufficient due to the combined mechanical and thermal action. Higher temperatures would result in problems, since they may lead to non sufficiently flexible selvedges, which break during following processing.

The cutting of the cloth or the separation of selvedges therefore can be achieved at wire temperatures which are only little above the melting temperature of the respective material combined with the above mentioned mechanical action. The cutting device can easily be adapted to various textile materials by simply adjusting the heating temperature accordingly. Therefore, a big range of textile material of different thickness can be cut with the same device. The range of application extends from 10 dtex to over 1000 dtex, without changing any element of the device.

During the cutting operation the cutting device is positioned relative to the transported cloth in its height and in its angle relative to the transport direction by said supporting body. In height the cutting device is adjusted such that the lower edge of the curved section 10 is about h=1 to 1.5 mm below the transporting plane of the cloth 1 (see FIG. 1). After being cut by the action of heat and by mechanical action of the forward edge of the curved section 10, the cloth travels with its edges along the flattened faces 5 of the heated wire, whereby the edges are sealed. Because of the relatively low temperature of the wire the textile material is melted only locally along the edges which provides for a good seal between the individual yarns at the cut edges.

In height the cutting device is adjusted such that the lower edge of the curved section 10 is about h=1 to 1.5 mm below the transporting plane of the cloth 1 (see FIG. 1). After being cutted by the action of heat and by mechanical action at the forward edge of the curved section 10 the cloth travels with its edges along the flattened faces 5 of the heated wire, whereby the edges are sealed. Because of the relatively low temperature of the wire the textile material is melted only locally along the edges which provides for a good seal between the individual yarns at the cutted edges.

The plane of the cloth 1 normally should not be higher than the inner edge of the curved and flattened section 10 of the wire. For very thick fabrics a height adjustment exceptionally may be advantageous, wherein the fabric is higher than said inner edge and therefore contacts the face 5 twice, which makes the control of the sealing easier in the case of very thick fabric.

Figure 6:
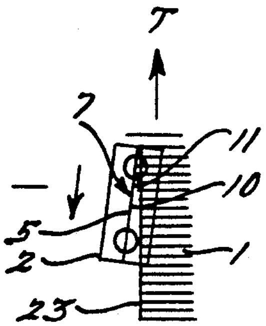
FIG. 6 schematically exhibits a cutting device in plan view in a position for weak sealing.
Figure 7:
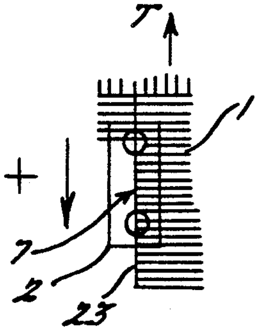
FIG. 7 schematically shows a position of the cutting device for strong sealing.

One of the major applications of the cutting device of the invention is the separation of selvedges in weaving looms by simultaneously sealing the new edges of the fabric. In such applications the cutting device is mounted with its supporting body 2 having a mounted bore 40 to a horizontal bar 20 extending from outside into the path of the woven cloth (see FIG. 5). Especially for such applications the angle of the cutting device relative to the transport direction T of the cloth can be adjusted to influence the degree of sealing of the edge. In FIGS. 6 and 7 the effects of the angle adjustment are schematically indicated in plan view. According to FIG. 7 the cutting device, i.e. the heated wire 7, is adjusted to extend parallel to the transport direction T. Since in this case face 5 is in contact with the edge along its whole length the sealing at the remaining edge 23 of the cloth is increased. If the cutting device, i.e. the heated wire 7 is adjusted to include an angle to the transport direction, as shown in FIG. 6, the face 5 of the wire is in contact with the edge only along a part of its length and for a shorter time, which reduces the degree of sealing. By this adjustment the degree of sealing can be precisely controlled between cutting without sealing and cutting with strong sealing of the edge.

Figure 8:
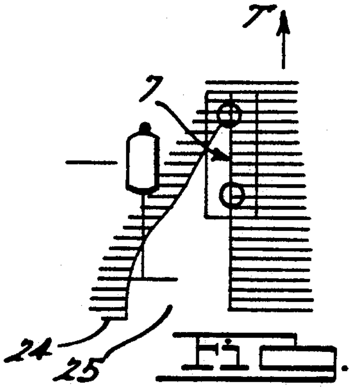
FIG. 8 exhibits a guiding device for guiding the textile material after cutting.

In FIG. 8 a guiding bar 25 for the cut-away portion 24 of the selvedge is disclosed which can be used to avoid unnecessary sealing of the cut-away portion 24 and thereby additional fouling of the wire 7.

Figure 9:
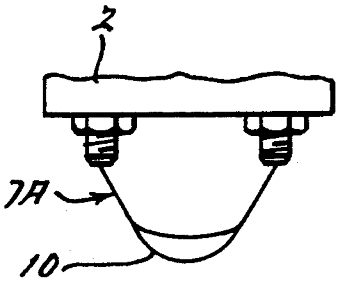
FIG. 9 to 11 are three further shapes of the cutting wire.
Figure 10:
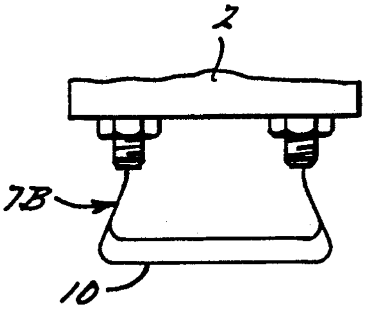
Figure 11:
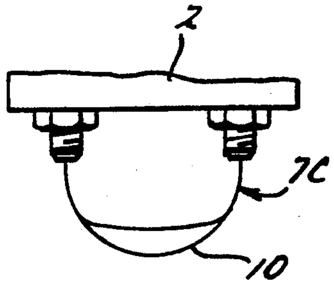
Figure 10A:
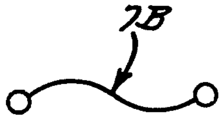
Figure 10B:
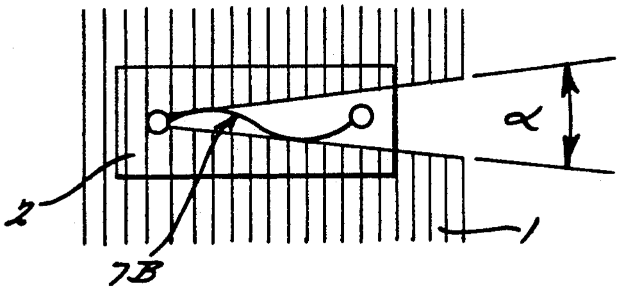

Whereas in the above described embodiment of the invention the cutting wire 7 has a curved flattened cutting section 10 between two bends 11, the shape of the wire can be varied. In FIGS. 9 to 11 further possible shapes of the cutting wire are exhibited. According to FIG. 9 the wire 7 has no additional bends 11. FIGS. 10 and 10*a* and 10*b* show a wire 7 and its application for central cutting of a cloth. Central cutting of a textile material does not allow to adjust the cutting wire into an angle to the transport direction as explained above since the two edges then would be sealed to a different degree. Therefore, in the embodiment of FIG. 10, the wire 7 in the cutting section 10 extends in S-shape in a plan view (see FIG. 10*a* and 10*b*). In side view, the wire extends in the plane of the cloth instead of being curved (see FIG. 10). A cutting wire of this shape allows to solve the problems of central cutting. As can be seen from FIG. 10*b* both edges travel for a defined distance along the face of the flattened wire in its cutting section 10. This cutting device is especially useful for elastic fabrics, in which the opening angle after cutting is relatively large. Even though a perfect sealing of the edge can be achieved with the described cutting device.

Figure 12:
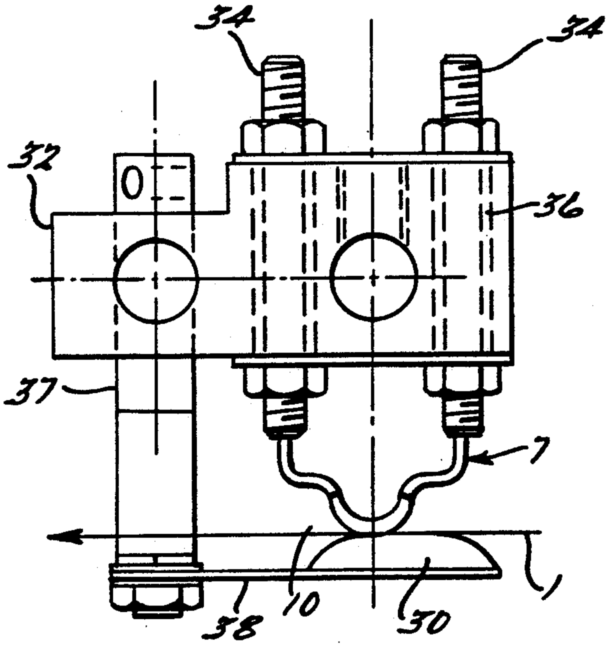
FIG. 12 to 13 exhibit a second embodiment of the invention in side view and front view, respectively, having a guiding member for the textile material arranged below the cutting wire.
Figure 13:
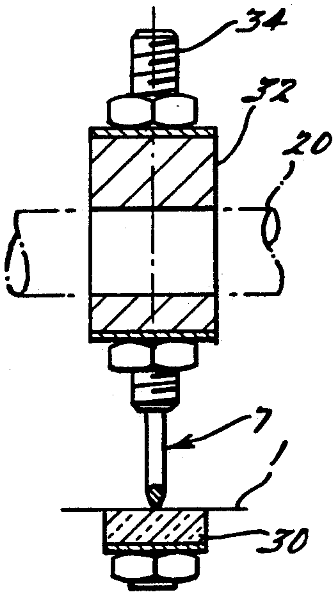

Finally, in FIG. 12 and 13 a further embodiment of the invention is disclosed in slightly enlarged side and front view. In this embodiment the cloth 1 to be cut is supported by means of a guiding member 30 of ceramic material when passed under the cutting section 10 of the cutting wire. As already described in connection with the other embodiments of the invention the cutting wire 7 is soldered to connection pins 34, mounted within a supporting body 32 and isolated therefrom by isolating layers 36. The mentioned guiding member 30 is mounted to a carrier bar 37 fixedly held in the supporting body and adjustable in height. The guiding member 30 is mounted on a spring member 38 which urges it with a defined force against the cutting section 10 of the cutting wire 7. The guiding member 30 is arranged to support the cloth 1 to be cutted already upstream of the point, where the cutting wire 7 contacts the guiding member 30. By the heat flow from the heated cutting wire through the contact point, the guiding member 30 is heated also, but to a lower temperature than the cutting wire 7. Since the guiding member 30 is of electrically isolating material, there is no electrical contact from the cutting wire 7 via the spring member 38 to the supporting body 32, which allows to electrically connect several of these cutting devices in parallel connection without causing a short circuit.

The cutting wire 7 is substantially of the same material and shape as already described. It contacts the guiding member 30 tangentially in its flattened cutting section 10. Since therefore the contact surface of the wire 7 with the guiding member 30 is reduced the heat flow from the heated wire to said member 30 is also reduced. The temperature of the guiding member 30 therefore is lower than the one of the wire 7, i.e. below the melting temperature of the cloth 1. Before being cutted, the cloth 1 therefore is preheated by the guiding member 30 on its lower surface. Accordingly, a reduced heat flow by the wire itself is necessary for reaching a sufficient temperature at which the cloth 1 is in a thermoplastic state.

At the contact point of the cutting wire 7 and the guiding member 30, an increased mechanical action is excercised on the cloth 1 since the cloth is supported by the guiding member against the wire.

The present embodiment of the invention is especially suited for heavy or thick fabrics, because of additional heat supply and additional mechanical action by said guiding member 30.

The described cutting devices allow to cut all kind of textile material, especially fabrics knitted material, by a combined mechanical and thermal action at a reduced temperature of the heated wire. This helps to avoid disadvantageous effects cauded by high wire temperatures, as thickened edges, and allows to exactly control the degree of sealing of the edges. The cutting devices can be integrated into weaving looms or other textile machines.

While there are shown and described present preferred embodiments of the invention, it is to be distinctly understood that the invention is not limited thereto, but may be otherwise variously embodied and practiced within the scope of the following claims.

We claim:

1. A device for cutting and sealing the edges of textile material transported along a path relative to said device, comprising a heated cutting member and a supporting means for said cutting member, said cutting member comprising a resistance wire having two end portions of round cross section mounted to said supporting means and connected to a current source and further having a flattened central portion, said central portion being shaped to form a bow of substantially semi-circular, symmetrical shape having two lateral flat faces parallel to each other, an outer edge ground to form a feather edge for cutting said textile material and an inner edge, said supporting means including means for adjusting the height of said central portion relative to said path of textile material so that said textile material contacts said central portion of the wire along a line which is substantially tangential to said inner edge and meets said outer edge at an acute angle.

2. The device of claim 1, wherein said central portion extends in a plane defining a cutting plane, said supporting means being adjustable in angular position relative to a direction of transport of said textile material, such that said cutting plane and said direction include a defined angle.

3. The device of claim l wherein said resistance wire is of a circular diameter of about 1 mm outside of said central portion and of a thickness of about 0.5 mm at said flattened cross section in said central portion.

4. The device of claim l, wherein said resistance wire has a substantially constant cross sectional area over its whole length.

5. The device of claim 1, wherein said cutting member comprises two additional bends adjacent to said central portion to compensate for heat expansion of the wire.

6. The device of claim 1, wherein said each of said two ends of said wire is connected to a connection pin, said connection pins being mounted within and electrically isolated from said supporting means.

7. The device of claim 1, wherein an additional guiding member is provided at said supporting means, said guiding member contacting said wire loop in said central portion and supporting said textile material towards said wire.

8. The device of claim 7, wherein said guiding member is urged by spring means against said cutting member.

9. The device of claim 7, wherein said guiding member is of ceramic material.

10. A device for cutting and sealing the edges of textile material transported along a path relative to said device, comprising a heated cutting member and a supporting means for said cutting member, said cutting member comprising a resistance wire having two end portions of round cross section mounted to said supporting means and connected to a current source and further having a flat central portion, said central portion being shaped to form a bow of substantially semi-circular, symmetrical shape having two lateral flat faces parallel to each other, an outer edge ground to form a feather edge for cutting said textile material, and an inner edge, said supporting means including a guiding member having an elongate flat guiding surface of ceramic material biased against said central portion of said resistance wire by means of a spring member, said supporting means including means for adjusting the height of the central portion relative to said path of the textile material so that said textile material is level to and guided over said surface of said guiding member, thereby meeting said central portion of the resistance wire at an acute angle.

* * * * *